US010662071B2

(12) United States Patent
Ozaki et al.

(10) Patent No.: US 10,662,071 B2
(45) Date of Patent: May 26, 2020

(54) ALUMINA AND SLURRY CONTAINING THE SAME, AND ALUMINA POROUS FILM USING THE SAME, LAMINATED SEPARATOR, NONAQUEOUS ELECTROLYTE SECONDARY BATTERY AND METHOD FOR MANUFACTURING NONAQUEOUS ELECTROLYTE SECONDARY BATTERY

(71) Applicant: SUMITOMO CHEMICAL COMPANY, LIMITED, Tokyo (JP)

(72) Inventors: Hirotaka Ozaki, Niihama (JP); Hiroyuki Ando, Niihama (JP)

(73) Assignee: SUMITOMO CHEMICAL COMPANY, LIMITED, Chuo-ku, Tokyo (JP)

( * ) Notice: Subject to any disclaimer, the term of this patent is extended or adjusted under 35 U.S.C. 154(b) by 0 days.

(21) Appl. No.: 16/075,833

(22) PCT Filed: Sep. 5, 2017

(86) PCT No.: PCT/JP2017/031935
§ 371 (c)(1),
(2) Date: Aug. 6, 2018

(87) PCT Pub. No.: WO2018/088004
PCT Pub. Date: May 17, 2018

(65) Prior Publication Data

US 2019/0031522 A1 Jan. 31, 2019

(30) Foreign Application Priority Data

Nov. 14, 2016 (JP) ................................ 2016-221785
Feb. 28, 2017 (JP) ................................ 2017-037303

(51) Int. Cl.
*C01F 7/02* (2006.01)
*H01M 4/13* (2010.01)
(Continued)

(52) U.S. Cl.
CPC ................ *C01F 7/02* (2013.01); *H01M 2/16* (2013.01); *H01M 4/13* (2013.01); *H01M 4/139* (2013.01); *H01M 4/62* (2013.01); *H01M 10/0566* (2013.01)

(58) Field of Classification Search
CPC .......... C01F 7/02; H01M 2/16; H01M 4/139; H01M 4/62; H01M 4/13
See application file for complete search history.

(56) References Cited

U.S. PATENT DOCUMENTS

2005/0182172 A1 8/2005 Kamimura et al.
2008/0193845 A1 8/2008 Muraoka et al.
(Continued)

FOREIGN PATENT DOCUMENTS

CN 101246972 A 8/2008
CN 101759216 A 6/2010
(Continued)

OTHER PUBLICATIONS

Communication dated Dec. 6, 2018 from the European Patent Office in counterpart application No. 18188546.8.
(Continued)

*Primary Examiner* — James A Fiorito
(74) *Attorney, Agent, or Firm* — Sughrue Mion, PLLC

(57) ABSTRACT

Alumina having excellent electrolytic solution stability, a slurry containing the same, an alumina porous film using the same, a laminated separator, a nonaqueous electrolyte secondary battery and a method for manufacturing the nonaqueous electrolyte secondary battery are provided. Alumina is provided including one or more selected from K, Mg, Ca,
(Continued)

Sr, Ba and La in the total amount of 200 to 50,000 ppm by mass, wherein a surface concentration of one or more elements is 0.5 to 20 at % in total. Alumina is provided in which in an infrared absorption spectrum of the alumina obtained by Fourier-transform infrared spectroscopy, a peak having an intensity larger than that of a baseline defined by a line segment connecting an intensity at 3,400 $cm^{-1}$ and an intensity at 3,500 $cm^{-1}$ and having a half width of 90 $cm^{-1}$ or less, does not exist in a range of 3,400 to 3,500 $cm^{-1}$.

6 Claims, 1 Drawing Sheet

(51) Int. Cl.

| | |
|---|---|
| ***H01M 2/16*** | (2006.01) |
| ***H01M 4/139*** | (2010.01) |
| ***H01M 4/62*** | (2006.01) |
| ***H01M 10/0566*** | (2010.01) |

(56) References Cited

U.S. PATENT DOCUMENTS

| | | | | |
|---|---|---|---|---|
| 2008/0206652 | A1 | 8/2008 | Abe et al. | |
| 2010/0021374 | A1 | 1/2010 | Mizuno et al. | |
| 2010/0167055 | A1 | 7/2010 | Ozaki et al. | |
| 2011/0206963 | A1 | 8/2011 | Fujita et al. | |
| 2011/0212357 | A1 | 9/2011 | Umehara | |
| 2011/0223492 | A1 | 9/2011 | Sakitani et al. | |
| 2015/0004465 | A1 * | 1/2015 | Ozaki | H01M 4/139 429/144 |
| 2015/0162599 | A1 | 6/2015 | Takei et al. | |
| 2015/0203686 | A1 | 7/2015 | Ozaki et al. | |
| 2018/0351147 | A1 | 12/2018 | Ozaki et al. | |

FOREIGN PATENT DOCUMENTS

| | | | |
|---|---|---|---|
| CN | 102125878 | A | 7/2011 |
| CN | 102190323 | A | 9/2011 |
| CN | 103464128 | A | 12/2013 |
| CN | 104248982 | A | 12/2014 |
| JP | 07-206434 | A | 8/1995 |
| JP | 9-147916 | A | 6/1997 |
| JP | 2001-172073 | A | 6/2001 |
| JP | 2002-175835 | A | 6/2002 |
| JP | 2003-192339 | A | 7/2003 |
| JP | 2005-206460 | A | 8/2005 |
| JP | 2008-156146 | A | 7/2008 |
| JP | 2008-210573 | A | 9/2008 |
| JP | Wo2010/052786 | A1 | 5/2010 |
| JP | 2010-278018 | A | 12/2010 |
| JP | 2011-77052 | A | 4/2011 |
| JP | 2011-102368 | A | 5/2011 |
| JP | 2011-192395 | A | 9/2011 |
| JP | 2012-94355 | A | 5/2012 |
| JP | 2012-160279 | A | 8/2012 |
| JP | 2014-055287 | A | 3/2014 |
| JP | 2015-18600 | A | 1/2015 |
| JP | 2015-041502 | A | 3/2015 |
| JP | 2015-115105 | A | 6/2015 |
| JP | 5830064 | B2 | 12/2015 |
| JP | 2016-72150 | A | 5/2016 |
| KR | 10-2014-0117415 | A | 10/2014 |
| KR | 10-2015-0039749 | A | 4/2015 |
| WO | 2017/187780 | A1 | 11/2017 |

OTHER PUBLICATIONS

Communication dated Dec. 20, 2018 from the European Patent Office in counterpart application No. 18188546.8.
Communication dated Mar. 6, 2018 issued by the Japanese Patent Office in counterpart application No. 2018-001832.
Notice of Preliminary Rejection dated Mar. 12, 2018 issued by the Korean Intellectual Property Office in counterpart application No. 10-2018-7000946.
Notice of Final Rejection dated May 30, 2018 issued by the Korean Intellectual Property Office in counterpart application No. 10-2018-7000946.
Notice of Preliminary Rejection dated Mar. 13, 2018 issued by the Korean Intellectual Property Office in counterpart application No. 10-2008-7001003.
Notice of Final Rejection dated May 30, 2018 issued by the Korean Intellectual Property Office in counterpart application No. 10-2018-7001003.
International Search Report of PCT/JP2017/031935 dated Oct. 24, 2017 [PCT/ISA/210].
Written Opinion of PCT/JP2017/031935 dated Oct. 24, 2017 [PCT/ISA/237].
Communication dated Jan. 14, 2019 from the State Intellectual Property Office of the P.R.C. in counterpart Application No. 201780010859.2.
Communication dated Feb. 14, 2019 from the European Patent Office in application No. 17868646.5.
Communication dated Mar. 8, 2019 from the National Intellectual Property Administration, P. R. China in counterpart Application No. 201810972884.5.
Non-Final Office Action dated Dec. 4, 2018 issued by the United States Patent and Trademark Office in U.S. Appl. No. 16/056,842.
Non-Final Office Action dated Mar. 15, 2019 issued by the United States Patent and Trademark Office in U.S. Appl. No. 16/056,842.
Communication dated Jun. 25, 2019 from the United States Patent and Trademark Office in U.S. Appl. No. 16/056,842.
Communication dated Nov. 22, 2019 by the USPTO in U.S. Appl. No. 16/056,842.
"Definition of mill (Entry 1 of 6)" Merriam-Webster, 2019, 1 page.
Communication dated Aug. 6, 2019 from the State Intellectual Property Office of the P.R.C in application No. 201810972884.5.
Communication dated Feb. 7, 2020 from European Patent Office in EP Application No. 17868646.5.

* cited by examiner

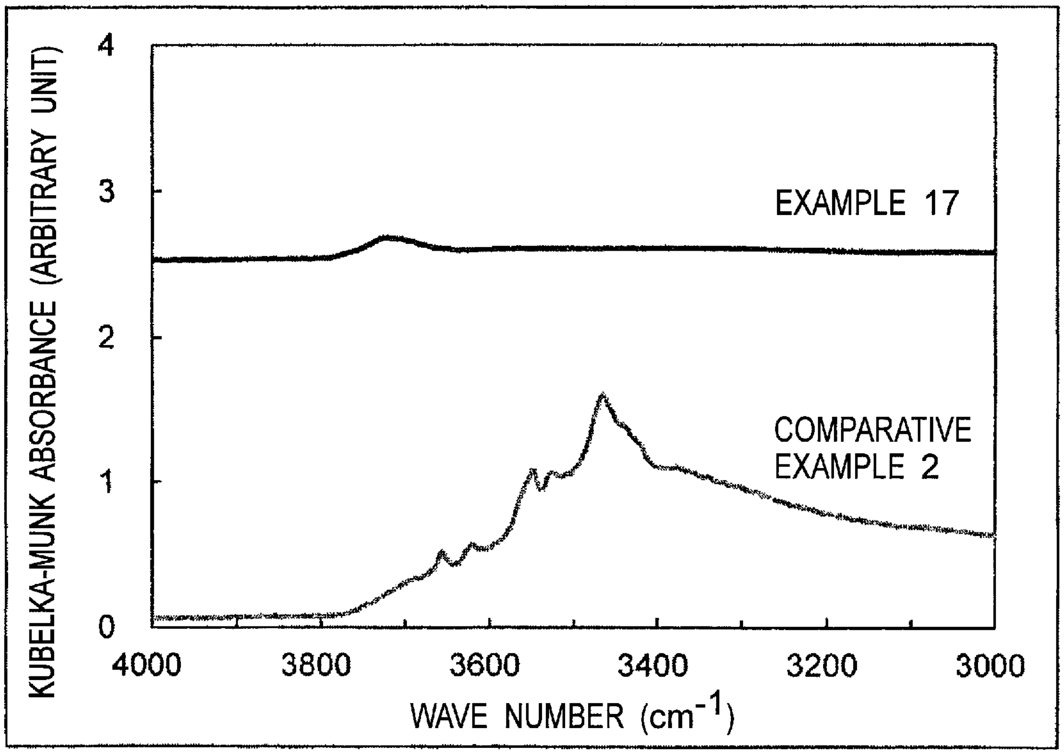
KUBELKA-MUNK ABSORBANCE (ARBITRARY UNIT)
4
3
2
1
0
EXAMPLE 17
COMPARATIVE EXAMPLE 2
4000
3800
3600
3400
3200
3000
WAVE NUMBER (cm-1)

ALUMINA AND SLURRY CONTAINING THE SAME, AND ALUMINA POROUS FILM USING THE SAME, LAMINATED SEPARATOR, NONAQUEOUS ELECTROLYTE SECONDARY BATTERY AND METHOD FOR MANUFACTURING NONAQUEOUS ELECTROLYTE SECONDARY BATTERY

CROSS REFERENCE TO RELATED APPLICATIONS

This application is a National Stage of International Application No. PCT/JP2017/031935, filed Sep. 5, 2017, claiming priority based on Japanese Patent Application No. 2016-221785, filed Nov. 14, 2016 and Japanese Patent Application No. 2017-037303, filed Feb. 28, 2017.

TECHNICAL FIELD

The present invention relates to alumina which is suitably used to form an alumina porous film on at least one surface of a positive electrode, a negative electrode, or a separator that constitutes a nonaqueous electrolyte secondary battery. The present invention also relates to a slurry containing the alumina, and a nonaqueous electrolyte secondary battery including an alumina porous film containing the alumina, and a method for manufacturing the same.

BACKGROUND ART

A nonaqueous electrolyte secondary battery, especially a lithium ion secondary battery, has high energy density, and has been used in household compact equipment such as a cell phone or a personal computer. In recent years, application to automobiles has also been accelerated, in addition to the compact equipment.

The nonaqueous electrolyte secondary battery is a battery using an organic solvent-based electrolytic solution, and usually includes a positive electrode and a negative electrode, and also includes a separator disposed for the purpose of electrically insulating between these electrode plates. As the separator, for example, a microporous sheet made of a polyolefin-based resin is used.

Regarding the separator made of the microporous sheet, if high temperature breaks out inside the battery due to some abnormality, a shutdown function possessed by the separator leads to clogging of holes of the separator, and thus the conductivity inside the battery is lost and a battery function is lost. In such manner, the separator plays a role of maintaining safety of the nonaqueous electrolyte secondary battery. However, if the temperature of the battery exceeds, for example 150° C. due to momentarily generated heat, the separator may quickly undergo contraction to cause intense short circuit between the positive electrode and the negative electrode. In this case, the temperature of the battery may be abnormally raised to several hundred degrees (° C.) or higher to cause a problem in safety aspects.

As a study for improving the heat resistance of the nonaqueous electrolyte secondary battery, for example, Patent Document 1 proposes the technique in which an alumina porous film containing alumina is formed on a surface of any one of a positive electrode, a negative electrode and a separator that constitute a lithium ion secondary battery. It is considered that the alumina porous film has high heat resistance, thereby suppressing quick contraction of the separator.

However, it has been known that, in the battery using the alumina porous film, a trace amount of hydrogen fluoride existing in the battery reacts with alumina, thereby fluorinating a surface of the alumina to produce water. The water reacts with an electrolytic solution to cause the decomposition of the electrolytic solution, leading to the generation of a gas. Therefore, the durability of the battery such as cycle characteristic and storage characteristic may be degraded. The generation of a gas may cause not only degradation of the durability of the battery but also expansion and breakage of the battery, which may cause degradation of the safety.

As mentioned above, while high heat resistance can be obtained by using alumina, there is a problem that a gas is generated due to alumina to cause the degradations of the durability and the safety of the battery. Thus, there has been required the technique that can suppress the decomposition of an electrolytic solution to reduce the generation of a gas (hereinafter, "little gas generation" is sometimes referred to as "excellent electrolytic solution stability") even when alumina is used to impart high heat resistance.

PRIOR ART DOCUMENT

Patent Document

Patent Document 1: JP 9-147916 A

DISCLOSURE OF THE INVENTION

Problems to be Solved by the Invention

The present invention has been made in view of the foregoing circumstance, and it is a main object of the present invention to provide alumina having excellent electrolytic solution stability and a slurry containing the same, and an alumina porous film using the same, a laminated separator, a nonaqueous electrolyte secondary battery and a method for manufacturing the nonaqueous electrolyte secondary battery.

Means for Solving the Problems

Since Alumina of the Present Invention Includes Two Aspects, Aspects Will be Divided into Two so that Each Aspect Will be Described Separately.

First Aspect of the Present Invention

Alumina according to the first aspect of the present invention includes one or more selected from the group consisting of K, Mg, Ca, Sr, Ba and La in the total amount of 200 to 50,000 ppm by mass, wherein a surface concentration of one or more elements is 0.5 to 20 at % in total.

The alumina according to the first aspect of the present invention may have a BET specific surface area of 1 to 20 $m^2/g$ and may be $\alpha$ alumina.

An alumina slurry according to the first aspect of the present invention includes: the alumina according to the first aspect of the present invention; a binder; and a solvent.

An alumina porous film according to the first aspect of the present invention includes: the alumina according to the first aspect of the present invention; and a binder.

A laminated separator according to the first aspect of the present invention include: a separator; and the alumina according to the first aspect of the present invention porous film.

A nonaqueous electrolyte secondary battery according to first aspect of the present invention is a nonaqueous electrolyte secondary battery, in which an alumina porous film containing the alumina according to the first aspect of the present invention is formed on at least one surface of a positive electrode, a negative electrode or a separator.

A method for manufacturing a nonaqueous electrolyte secondary battery according to the first aspect of the present invention includes: applying the alumina slurry according to the first aspect of the present invention onto at least one surface of a positive electrode, a negative electrode or a separator, followed by drying the alumina slurry to form an alumina porous film.

Second Aspect of the Present Invention

Alumina according to the second aspect of the present invention is alumina, wherein in an infrared absorption spectrum of the alumina obtained by Fourier-transform infrared spectroscopy, a peak having an intensity larger than that of a baseline defined by a line segment connecting an intensity at 3,400 $cm^{-1}$ and an intensity at 3,500 $cm^{-1}$ and having a half width of 90 $cm^{-1}$ or less, does not exist in a range of 3,400 to 3,500 $cm^{-1}$.

The alumina according to the second aspect of the present invention is alumina, in which, in thermogravimetric analysis, a mass loss rate A of alumina represented by the following formula (I) is 0.3% or less and a mass loss rate B of alumina represented by the following formula (II) is 0.05% or less.

$$\text{Mass loss rate } A\ [\%]=(\text{mass [g] of alumina at } 25^\circ\ \text{C.}-\text{mass [g] of alumina at } 150^\circ\ \text{C.})\div\text{mass [g] of alumina at } 25^\circ\ \text{C.}\times100 \quad \text{Formula (I)}$$

$$\text{Mass loss rate } B\ [\%]=(\text{mass [g] of alumina at } 200^\circ\ \text{C.}-\text{mass [g] of alumina at } 260^\circ\ \text{C.})\div\text{mass [g] of alumina at } 25^\circ\ \text{C.}\times100 \quad \text{Formula (II)}$$

The alumina according to the second aspect of the present invention is alumina which may have the total content of K, Mg, Ca, Sr, Ba and La of less than 200 ppm by mass.

The alumina according to the second aspect of the present invention may have a BET specific surface area of 1 to 20 $m^2/g$ and may be $\alpha$ alumina.

An alumina slurry according to the second aspect of the present invention includes: the alumina according to the second aspect of the present invention; a binder; and a solvent.

An alumina porous film according to the second aspect of the present invention includes the alumina according to the second aspect of the present invention and a binder.

A laminated separator according to the second aspect of the present invention includes: a separator; and the alumina porous film according to the second aspect of the present invention.

A nonaqueous electrolyte secondary battery according to second aspect of the present invention is a nonaqueous electrolyte secondary battery, in which an alumina porous film containing the alumina according to the second aspect of the present invention is formed on at least one surface of a positive electrode, a negative electrode or a separator.

A method for manufacturing a nonaqueous electrolyte secondary battery according to the second aspect of the present invention includes: applying the alumina slurry according to the second aspect of the present invention onto at least one surface of a positive electrode a negative electrode, or a separator, followed by drying the alumina slurry to form an alumina porous film.

Effects of the Invention

The present invention provides alumina having excellent electrolytic solution stability and a slurry containing the same, and an alumina porous film using the same, a laminated separator, a nonaqueous electrolyte secondary battery and a method for manufacturing the nonaqueous electrolyte secondary battery.

BRIEF DESCRIPTION OF THE DRAWINGS

FIG. 1 is a graph showing an infrared absorption spectrum of alumina obtained by Fourier-transform infrared spectroscopy in the second aspect of the present invention.

MODE FOR CARRYING OUT THE INVENTION

Hereinafter, detailed description will be made of alumina according to the present invention, and a slurry containing the same, and an alumina porous film using the same, a laminated separator, a nonaqueous electrolyte secondary battery and a method for manufacturing the nonaqueous electrolyte secondary battery. Since alumina of the present invention includes two aspects, first aspect and second aspect will be described separately, but matter(s) which is common to both aspects will be mentioned as common matter(s).

Alumina According to First Aspect of the Present Invention

An alumina according to the first aspect of the present invention includes one or more selected from the group consisting of K, Mg, Ca, Sr, Ba and La in the total amount of 200 to 50,000 ppm by mass, and a surface concentration of one or more elements is 0.5 to 20 at % (atomic %) in total.

Each configuration will be described in detail below.

[One or more selected from the group consisting of K, Mg, Ca, Sr, Ba and La: 200 to 50,000 ppm by mass in total]

The alumina according to the first aspect of the present invention includes one or more selected from the group consisting of the elements in the total amount of 200 to 50,000 ppm by mass. Small content of the element leads to degradation of the electrolytic solution stability. Meanwhile, excessive content of the element leads to formation of agglomerates of the element to cause clogging of holes of an alumina porous film due to the agglomerates, and thus ion permeability may be degraded.

The content of the element is preferably 500 ppm by mass or more, and more preferably 2,000 ppm by mass or more, and is preferably 20,000 ppm by mass or less, and more preferably 10,000 ppm by mass or less.

[Surface concentration of one or more elements selected from the group consisting of K, Mg, Ca, Sr, Ba and La: 0.5 to 20 at % in total]

The inventors have made a study on the electrolytic solution stability by controlling the concentration of the element on an alumina surface using X-ray photoelectron spectroscopy as means for measuring the concentration of the element on the alumina surface. As a result, they have found it possible to obtain alumina having excellent electrolytic solution stability by controlling the surface concentration of one or more elements selected from the group consisting of K, Mg, Ca, Sr, Ba and La to 0.5 to 20 at % in total. Small alumina surface concentration of the element leads to degradation of the electrolytic solution stability due to lack of the element. Meanwhile, excessive alumina surface concentration of the element leads to excessive element to cause liberation of the element component with degraded bond to the alumina surface and may thus suppress ion transport during charging/discharging of the battery.

As used herein, "surface concentration" means the concentration of the element on an alumina surface measured by X-ray photoelectron spectroscopy. The element to be measured by X-ray photoelectron spectroscopy usually exists within about several nm from a sample surface. An X-ray source is not particularly limited as long as K, Mg, Ca, Sr, Ba and La can be measured, and it is preferred to use AlKα-ray.

The alumina surface concentration of the element is preferably 1 at % or more, and more preferably 3 at % or more, and is preferably 15 at % or less, and more preferably 10 at % or less.

The alumina according to the first aspect of the present invention is not particularly limited, and may be α (alpha) alumina, γ (gamma) alumina, η (eta) alumina, θ (theta) alumina, δ (delta) alumina, χ (chi) alumina or κ (kappa) alumina. An alumina hydrate containing crystallization water may be boehmite, diaspore, gibbsite, bayerite or norstrandite. The alumina may include one type thereof, or may include two or more types thereof in a mixture state. Among them, α alumina which has excellent insulation properties and heat resistance and chemically stable is preferred. The α alumina in the present invention refers to alumina containing an α phase as a main crystalline phase. Even if alumina contains alumina of the other crystalline phase or alumina hydrate, alumina containing an α phase as a main crystalline phase is referred to as α alumina. The crystalline phase can be specified by, for example, powder X-ray diffractometry. When a peak having the largest intensity, among all diffraction peaks in a range of 10 to 70 deg of a diffraction angle 2θ measured using powder X-ray diffractometry, is assigned to α phase alumina, said alumina is referred to as alumina containing an α phase as a main crystalline phase.

It is preferred to use the alumina according to the first aspect of the present invention in the form of particles. In the alumina according to the first aspect of the present invention, the proportion of alumina particles having a particle diameter of smaller than 1.0 μm is preferably 50% or more, more preferably 55% or more, still more preferably 60% or more, and most preferably 65% or more, relative to the number of all alumina particles constituting the alumina. The upper limit of the proportion is not particularly limited and may be 100%. By using the alumina having the proportion in the above range, the porosity of an alumina porous film can be controlled to a preferable range to obtain an alumina porous film having excellent ion permeability and electrolytic solution retaining performance. The particle size distribution of alumina particles can be measured by a laser diffraction method using a laser particle size distribution analyzer.

In the alumina porous film obtained from the alumina having the above proportion, a contact point between alumina particles increases, thus enabling formation of a strong three-dimensional network while maintaining preferable porosity. As a result, the alumina porous film thus obtained has high strength and powder falling of the alumina decreases, leading to, for example, an improvement in heat resistance and dimensional stability of the separator, and thus a nonaqueous electrolyte secondary battery having higher safety can be obtained.

The purity of the alumina according to the first aspect of the present invention is usually 99% by mass or more, and preferably 99.9% by mass or more, among other components excluding K, Mg, Ca, Sr, Ba and La.

"Purity" of the alumina according to the first aspect of the present invention is calculated from the following formula (III) using the contents of K, Mg, Ca, Sr, Ba and La and the contents of $SiO_2$, $Na_2O$, CuO, $Fe_2O_3$ and $ZrO_2$ in 100% by mass of the alumina. The measuring method is mentioned later in Examples using, as an example, the case where alumina is α alumina.

Purity (% by mass)=100×{100−(sum total [% by mass] of the contents of K, Mg, Ca, Sr, Ba and La)−(sum total [% by mass] of the contents of $SiO_2$, $Na_2O$, CuO, $Fe_2O_3$ and $ZrO_2$)}÷{100−(sum total [% by mass] of the contents of K, Mg, Ca, Sr, Ba and La])} Formula (III)

Particularly, when the alumina according to the first aspect of the present invention is α alumina, for example in battery applications, if the purity is less than 99% by mass, the amount of Si, Na, Fe or the like contained in α alumina increases, thus unfavorably, failing to obtain satisfactory electrical insulation properties as well as causing increase in mixing amount of metallic foreign objects that may cause short circuit.

The BET specific surface area of the alumina according to the first aspect of the present invention is preferably 1 $m^2/g$ or more, and more preferably 5 $m^2/g$ or more, and is preferably 20 $m^2/g$ or less, and more preferably 15 $m^2/g$ or less. If the alumina has a large BET specific surface area, connection with a binder is improved when an alumina porous film is produced by the method mentioned later to obtain an alumina porous film having high strength. However, if the BET specific surface area is too large, it becomes difficult to remove moisture by drying when an alumina porous film is produced by the method mentioned later, which unfavorably causes increase in moisture incorporated into the battery.

The method for manufacturing α alumina includes, for example, a method in which aluminum hydroxide produced by the Bayer's method is calcined; a method in which aluminum hydroxide produced by the aluminum alkoxide method is calcined; a method of synthesizing using organoaluminum; a method in which a raw material such as transition alumina or an alumina powder which is converted into transition alumina by a heat treatment is calcined in an atmospheric gas containing hydrogen chloride; and a method mentioned in JP 11-049515 A, JP 2010-150090 A, JP 2008-100903 A, JP 2002-047009 A or JP 2001-354413 A.

The Bayer's method includes a method in which a sodium aluminate aqueous solution in a supersaturation state is prepared and seed is added in this aqueous solution to precipitate an aluminum component contained in the aqueous solution, and then the thus obtained slurry containing aluminum hydroxide is washed and dried to obtain a dry-powdered aluminum hydroxide.

By calcining the dry-powdered aluminum hydroxide obtained, the objective α alumina can be obtained.

The aluminum hydroxide is usually calcined in a state of being filled into a calcination container. The calcination container includes, for example, pod, saggar or the like.

The material of the calcination container is preferably alumina from the viewpoint of the prevention of contamination of the obtained α alumina, and particularly preferably high-purity α alumina. From the viewpoint of heat resistance and cycle characteristic during use of the calcination container, a material containing silica in an appropriate range may be used.

The method for filling the aluminum hydroxide into the calcination container is not particularly limited, and the aluminum hydroxide may be filled into the calcination container by the self-weight, or filled after consolidation.

Examples of the calcination furnace to be used for calcination of the aluminum hydroxide include a material ventilation type calcination furnaces typified by a tunnel kiln, a batch airflow box type calcination furnace or a batch parallel airflow box type calcination furnace, a rotary kiln or an electric furnace.

The calcination temperature of the aluminum hydroxide, the temperature rising rate to the calcination temperature, and the calcination time are appropriately selected so as to obtain α alumina having desired physical properties.

The calcination temperature of the aluminum hydroxide is, for example, 1,000° C. or higher and 1,450° C. or lower, and preferably 1,000° C. or higher and 1,350° C. or lower. The temperature rising rate when the temperature is raised to this calcination temperature is usually 30° C./hour or more and 500° C./hour or less. The calcination times of the aluminum hydroxide is usually 0.5 hour or more and 24 hours or less, and preferably 1 hour or more and 20 hours or less.

The aluminum hydroxide may be calcined, for example, in an air atmosphere, or an inert gas atmosphere such as a nitrogen gas or argon gas atmosphere, or may be calcined in an atmosphere with high partial water vapor pressure, like a gas furnace for calcination by combustion of a propane gas. Usually, when calcined in an atmosphere with high partial water vapor pressure, the obtained particles are easily densified by the effect of water vapor, unlike calcination in the air atmosphere.

The α alumina obtained after calcination is sometimes agglomerated in a state where the average particle diameter exceeds 10 μm. In that case, it is preferred to crush the powder so as to adjust the average particle diameter to less than 1.0 μm.

In that case, the powder can be crushed using, for example, known devices such as a vibration mill, a ball mill, and a jet mill, and it is possible to use either a method of crushing in a dry state or a method of crushing in a wet state. When crushing in a dry state, known auxiliary agents may be added for the purpose of improving productivity, and a classifier may be used in combination.

There is no particular limitation on the conditions for crushing. When using a ball mill, the peripheral velocity of the outermost periphery of the mill is, for example, 0.1 m/s or more and 10 m/s or less, and preferably 0.5 m/s or more and 5 m/s or less, and the milling time is usually 0.5 hour or more and 24 hours or less, and preferably 1 hour or more and 20 hours or less. The diameter of a ball used as crushing media is, for example, 0.5 mm or more and 50 mm or less, and preferably 5 mm or more and 50 mm or less. The material of crushing media is not particularly limited, and it is possible to use an alumina ball, a zirconia ball, a titania ball, an iron core-containing resin ball and the like. In view of prevention of mixing of heteroelement and abrasion resistance, the alumina ball is preferable.

In the first aspect of the present invention, the method of allowing the alumina to contain one or more selected from the group consisting of K, Mg, Ca, Sr, Ba and La is not particularly limited and may be, for example, a method in which an oxide, a hydroxide, a carbonate, an acetate or a nitrate thereof (hereinafter sometimes referred to as oxide or the like) is added to the alumina and mixed, and then the mixture obtained is calcined.

The oxide or the like may be added to the alumina in the form of a solid or a solution thereof. The solvent used to prepare the solution may be appropriately selected taking into account the solubility and concentration of the oxide.

The mixing method after the addition of the oxide or the like is not particularly limited, and may be performed using a ball mill or a mixer, or may be performed by dispersing into an alcohol solution through ultrasonic wave, followed by evaporation to dryness, or may be simultaneously performed when the alumina is crushed using a ball mill or the like.

To fix the oxide or the like to an alumina surface, the obtained mixture is preferably heated. There is no particular limitation on the heating conditions, and heating can be performed using a heating apparatus such as a drying furnace or a calcination furnace, and heating can be performed simultaneously with mixing by a ball mill or the like. The heating temperature is, for example, 100° C. or higher and 1,000° C. or lower, and preferably 400° C. or higher and 800° C. or lower. The temperature rising rate when the temperature is raised to this heating temperature is usually 30° C./hour or more and 500° C./hour or less. The heating time is usually 0.5 hour or more and 24 hours or less, and preferably 1 hour or more and 5 hours or less. If the heating temperature exceeds 1,000° C., sintering of the alumina proceeds to incorporate an additive element into an interface of particles, and thus the concentrations of K, Mg, Ca, Sr, Ba and La on an alumina surface may decrease. Therefore, the heating temperature is preferably 1,000° C. or lower.

The alumina according to the first aspect of the present invention may be subjected to a surface treatment. Examples of the method of a surface treatment include, but are not limited as long as the effects obtained by the present invention are not significantly impaired, a method in which a surface treatment agent such as a coupling agent or a surfactant is used. The coupling agent may have a functional group such as an amino group, an epoxy group or an isocyanate group in a molecular structure thereof. The surface treatment of the alumina with a coupling agent having these functional groups exerts the effect of improving connection with a binder and improving the dispersibility of the alumina in the below-mentioned alumina slurry.

The alumina according to the first aspect of the present invention is alumina containing one or more selected from the group consisting of K, Mg, Ca, Sr, Ba and La, preferably alumina containing one or more selected from the group consisting of Mg, Ca, Sr, Ba and La from the viewpoint of the object of the present invention, and still more preferably alumina containing one or more selected from the group consisting of Mg, Ca and La. The alumina according to the first aspect of the present invention is yet preferably alumina containing one or more selected from the group consisting of Mg and La from the viewpoint of the reaction resistance to moisture in an air, and particularly preferably alumina containing Mg from the viewpoint of the resistance to elution of the element. The alumina according to the first aspect of the present invention may be alumina containing one or more selected from the group consisting of K, Mg, Ca, Sr and Ba, alumina containing one or more selected from the group consisting of Mg, Ca, Sr and Ba, or alumina containing one or more selected from the group consisting of Mg and Ca.

Alumina According to Second Aspect of the Present Invention

The alumina according to the second aspect of the present invention is alumina, wherein in an infrared absorption spectrum of the alumina obtained by Fourier-transform infrared spectroscopy, a peak having an intensity larger than that of a baseline defined by a line segment connecting an intensity at 3,400 $cm^{-1}$ and an intensity at 3,500 $cm^{-1}$ and having a half width of 90 $cm^{-1}$ or less, does not exist in a range of 3,400 to 3,500 $cm^{-1}$. The alumina according to the second aspect of the present invention, which has such infrared absorption spectrum, contains a small amount of hydrated water in alumina trihydrate on an alumina surface and has excellent electrolytic solution stability. Meanwhile, when the peak exists in a range of 3,400 to 3,500 $cm^{-1}$, there is the large amount of hydrated water which accelerates the reaction between an electrolyte used generally in a lithium ion secondary battery and the like and the hydrated water, and thus a gas component tends to be generated.

The absorption that appears in a range of 3,400 to 3,500 $cm^{-1}$ is assigned to an OH group of hydrated water in alumina trihydrate, and alumina trihydrate includes gibbsite, bayerite or norstrandite and is represented by $Al_2O_3.3H_2O$ or $Al(OH)_3$. By reducing the amount of hydrated water in alumina trihydrate existing on an alumina surface, excellent electrolytic solution stability can be obtained.

Regarding the alumina according to the second aspect of the present invention, in thermogravimetric analysis, a mass loss rate A of alumina represented by the following formula (I) may be 0.3% or less and a mass loss rate B of alumina represented by the following formula (II) may be 0.05% or less.

Mass loss rate *A* [%]=(mass [g] of alumina at 25° C.−mass [g] of alumina at 150° C.)÷mass [g] of alumina at 25° C.×100 Formula (I)

Mass loss rate *B* [%]=(mass [g] of alumina at 200° C.−mass [g] of alumina at 260° C.)÷mass [g] of alumina at 25° C.×100 Formula (II)

Mass loss occurs during heating to 150° C. since a water component adsorbed onto the alumina surface is desorbed and controlling the mass loss rate A to 0.3% or less enables reduction in water component desorbed from the alumina even if the temperature of the battery in a use state becomes higher, thus suppressing the decomposition of an electrolyte and an electrolytic solution, leading to longer life of the battery. Mass loss occurs at the temperature in a range of 200° C. to 260° C. since hydrated water in alumina trihydrate is desorbed as a water component and controlling a mass loss rate B to 0.05% or less enables further reduction in hydrated water in alumina trihydrate existing on an alumina surface, thus obtaining more excellent electrical stability.

From the viewpoint of minimizing incorporation of a water component into the battery, the mass loss rate A is preferably 0.3% or less, and more preferably 0.2% or less. The mass loss rate A is preferably decreased as much as possible and is usually 0.01% or more.

From the viewpoint of obtaining more excellent electrical stability, the mass loss rate B is more preferably 0.05% or less, and still more preferably 0.02% or less. The mass loss rate B is preferably decreased as much as possible and is usually 0.001% or more.

The maximum value of a mass loss rate per 10° C. of the alumina in a range of 200 to 260° C., i.e., a mass loss rate C of alumina represented by the following formula (IV) is preferably 0.01% or less. Controlling the maximum value to 0.01% or less enables further suppression of the generation of a gas due to the reaction between the alumina and the electrolytic solution when the temperature of the battery becomes higher.

Mass loss rate *C* [%]=(mass [g] of alumina at *t* [° C.]−mass [g] of alumina at (*t*+10) [° C.])÷mass [g] of alumina at *t* [° C.]×100 Formula (IV)

where $200 \le t \le 250$.

The conditions of thermogravimetric analysis are not particularly limited as long as the measurement is continuously performed under the condition in which a temperature rising is started at a temperature lower than 25° C. and ended at a temperature higher than 260° C. The temperature rising rate may be appropriately selected, for example, in a range from 5° C./minute to 20° C./minute. The alumina to be measured is dried in advance at the temperature of 80° C. or higher and 100° C. or lower for 8 hours or more before the measurement, and then conditioned under standard temperature conditions level 2, and standard humidity conditions level 2 (temperature of 23±2° C., relative humidity of 50±5%) defined in JIS Z8703-1983 (standard conditions of test place) for 24 hours or more, and then subjected to thermogravimetric analysis.

The purity of the alumina according to the second aspect of the present invention is usually 99% by mass or more, and preferably 99.9% by mass or more.

"Purity" of the alumina according to the second aspect of the present invention is calculated from the following formula (V) using the contents of $SiO_2$, $Na_2O$, CuO, $Fe_2O_3$ and $ZrO_2$ in 100% by mass of the alumina. The measuring method is mentioned later in Examples using, as an example, the case where alumina is α alumina.

Purity (% by mass)=100−(sum total [% by mass] of the contents of $SiO_2$, $Na_2O$, CuO, $Fe_2O_3$ and $ZrO_2$) Formula (V)

Particularly, when the alumina according to the second aspect of the present invention is α alumina, for example in battery applications, if the purity is less than 99% by mass, the amount of Si, Na, Fe or the like contained in α alumina increases, thus unfavorably, failing to obtain satisfactory electrical insulation properties as well as causing increase in mixing amount of metallic foreign objects that may cause short circuit.

Regarding the alumina according to the second aspect of the present invention, the total content of K, Mg, Ca, Sr, Ba and La is preferably less than 200 ppm by mass, more preferably 150 ppm by mass or less, and still more preferably 100 ppm by mass or less.

The BET specific surface area of the alumina according to the second aspect of the present invention is preferably 1 $m^2/g$ or more, and more preferably 5 $m^2/g$ or more, and is preferably 20 $m^2/g$ or less, and more preferably 15 $m^2/g$ or less. If the alumina has a large BET specific surface area, connection with a binder is improved when an alumina porous film is produced by the method mentioned later to obtain an alumina porous film having high strength. However, if the BET specific surface area is too large, it becomes difficult to remove moisture by drying when an alumina porous film is produced by the method mentioned later, which unfavorably causes increase in moisture incorporated into the battery.

The alumina according to the second aspect of the present invention is not particularly limited, and may be α (alpha) alumina, γ (gamma) alumina, η (eta) alumina, θ (theta) alumina, δ (delta) alumina, χ (chi) alumina or κ (kappa) alumina. As long as the effects obtained by the present invention are not significantly impaired, the alumina according to the second aspect of the present invention can include alumina monohydrate containing crystallization water (represented by $Al_2O_3.H_2O$ or AlO(OH)), i.e., boehmite or diaspore. These alumina(s) may include one type thereof, or may include two or more types thereof in a mixture state. Among them, α alumina which has excellent insulation properties and heat resistance and chemically stable is preferred. The α alumina in the present invention refers to alumina containing an α phase as a main crystalline phase. Even if alumina contains alumina of the other crystalline phase or alumina hydrate, alumina containing an α phase as a main crystalline phase is referred to as α alumina. The crystalline phase can be specified by, for example, powder X-ray diffractometry. When a peak having the largest intensity, among all diffraction peaks in a range of 10 to 70 deg of a diffraction angle 2θ measured using powder X-ray diffractometry, is assigned to α phase alumina, said alumina is referred to as alumina containing an α phase as a main crystalline phase.

It is preferred to use the alumina according to the second aspect of the present invention in the form of particles. In the alumina according to the second aspect of the present invention, the proportion of alumina particles having a particle diameter of smaller than 1.0 μm is preferably 50% or more, more preferably 55% or more, still more preferably 60% or more, and most preferably 65% or more, relative to the number of all alumina particles constituting the alumina. The upper limit of the proportion is not particularly limited and may be 100%. By using the alumina having the proportion in the above range, the porosity of an alumina porous film can be controlled to a preferable range to obtain an alumina porous film having excellent ion permeability and electrolytic solution retaining performance. The particle size distribution of alumina particles can be measured by a laser diffraction method using a laser particle size distribution analyzer.

In the alumina porous film obtained from the alumina having the above proportion, a contact point between alumina particles increases, thus enabling formation of a strong three-dimensional network while maintaining preferable porosity. As a result, the alumina porous film thus obtained has high strength and powder falling of the alumina decreases, leading to, for example, an improvement in heat resistance and dimensional stability of the separator, and thus a nonaqueous electrolyte secondary battery having higher safety can be obtained.

The method for manufacturing α alumina includes, for example, a method in which aluminum hydroxide produced by the Bayer's method is calcined; a method in which aluminum hydroxide produced by the aluminum alkoxide method is calcined; a method of synthesizing using organoaluminum; a method in which a raw material such as transition alumina or an alumina powder which is converted into transition alumina by a heat treatment is calcined in an atmospheric gas containing hydrogen chloride; and a method mentioned in JP 11-049515 A, JP 2010-150090 A, JP 2008-100903 A, JP 2002-047009 A or JP 2001-354413 A.

The Bayer's method includes a method in which a sodium aluminate aqueous solution in a supersaturation state is prepared and seed is added in this aqueous solution to precipitate an aluminum component contained in the aqueous solution, and then the thus obtained slurry containing aluminum hydroxide is washed and dried to obtain a dry-powdered aluminum hydroxide.

By calcining the dry-powdered aluminum hydroxide obtained, the objective α alumina can be obtained.

The aluminum hydroxide is usually calcined in a state of being filled into a calcination container. The calcination container includes, for example, pod, saggar or the like.

The material of the calcination container is preferably alumina from the viewpoint of the prevention of contamination of the obtained α alumina, and particularly preferably high-purity α alumina. From the viewpoint of heat resistance and cycle characteristic during use of the calcination container, a material containing silica in an appropriate range may be used.

The method for filling the aluminum hydroxide into the calcination container is not particularly limited, and the aluminum hydroxide may be filled into the calcination container by the self-weight, or filled after consolidation.

Examples of the calcination furnace to be used for calcination of the aluminum hydroxide include a material ventilation type calcination furnaces typified by a tunnel kiln, a batch airflow box type calcination furnace or a batch parallel airflow box type calcination furnace, a rotary kiln or an electric furnace.

The calcination temperature of the aluminum hydroxide, the temperature rising rate to the calcination temperature, and the calcination time are appropriately selected so as to obtain α alumina having desired physical properties.

The calcination temperature of the aluminum hydroxide is, for example, 1,000° C. or higher and 1,450° C. or lower, and preferably 1,000° C. or higher and 1,350° C. or lower. The temperature rising rate when the temperature is raised to this calcination temperature is usually 30° C./hour or more and 500° C./hour or less. The calcination times of the aluminum hydroxide is usually 0.5 hour or more and 24 hours or less, and preferably 1 hour or more and 20 hours or less.

The aluminum hydroxide may be calcined, for example, in an air atmosphere, or an inert gas atmosphere such as a nitrogen gas or argon gas atmosphere, or may be calcined in an atmosphere with high partial water vapor pressure, like a gas furnace for calcination by combustion of a propane gas. Usually, when calcined in an atmosphere with high partial water vapor pressure, the obtained particles are easily densified by the effect of water vapor, unlike calcination in the air atmosphere.

The α alumina obtained after calcination is sometimes agglomerated in a state where the average particle diameter exceeds 10 μm. In that case, it is preferred to crush the powder so as to adjust the average particle diameter to less than 1.0 μm.

In that case, the powder can be crushed using, for example, known devices such as a vibration mill, a ball mill, and a jet mill, and it is possible to use either a method of crushing in a dry state or a method of crushing in a wet state. When crushing in a dry state, known auxiliary agents may be added for the purpose of improving productivity, and a classifier may be used in combination.

There is no particular limitation on the conditions for crushing. When using a ball mill, the peripheral velocity of the outermost periphery of the mill is, for example, 0.1 m/s or more and 10 m/s or less, and preferably 0.5 m/s or more and 5 m/s or less, and the milling time is usually 0.5 hour or more and 24 hours or less, and preferably 1 hour or more and 20 hours or less. The diameter of a ball used as crushing media is, for example, 0.5 mm or more and 50 mm or less, and preferably 5 mm or more and 50 mm or less. The material of crushing media is not particularly limited, and it is possible to use an alumina ball, a zirconia ball, a titania ball, an iron core-containing resin ball and the like. In view of prevention of mixing of heteroelement and abrasion resistance, the alumina ball is preferable.

In the second aspect of the present invention, to reduce the amount of hydrated water in alumina trihydrate existing on an alumina surface, it is possible to employ, for example, a method in which crushed alumina is heated at 250° C. or higher, a method in which alumina hydrate is removed by dissolving with an acid or a base, or a method in which an organic component or an inorganic ion is reacted with hydrated water in alumina trihydrate. From the viewpoint capable of being surely removing hydrated water, a method by heating is preferable. There is no particular limitation on the heating conditions as long as the heating temperature is 250° C. or higher, and heating can be performed using a heating apparatus such as a drying furnace or a calcination furnace, and heating can be performed simultaneously with mixing by a ball mill or the like. From the viewpoint of not only removing water but also modifying an alumina surface to prevent rehydration, heating temperature is preferably 300° C. or higher and 1,000° C. or lower, and more preferably 400° C. or higher and 800° C. or lower. The temperature rising rate when the temperature is raised to the heating temperature is usually 30° C./hour or more and 500° C./hour or less. The heating time is usually 0.5 hour or more and 24 hours or less, and preferably 1 hour or more and 5 hours or less. If the heating temperature exceeds 1,000° C., sintering of the alumina may proceed to form coarse particles having a size of more than 100 μm. Therefore, the heating temperature is preferably 1,000° C. or lower.

The alumina according to the second aspect of the present invention may be subjected to a surface treatment. Examples of the method of a surface treatment include, but are not limited as long as the effects obtained by the present invention are not significantly impaired, a method in which a surface treatment agent such as a coupling agent or a surfactant is used. The coupling agent may have a functional group such as an amino group, an epoxy group, or an isocyanate group in a molecular structure thereof. The surface treatment of the alumina with a coupling agent having these functional groups exerts the effect of improving connection with a binder and improving the dispersibility of the alumina in the below-mentioned alumina slurry.

Matter(s) Common to Alumina of First Aspect and Alumina of Second Aspect According to the Present Invention Hereinafter, matter(s) which is common to alumina of the first aspect and alumina of the second aspect according to the present invention are collectively mentioned. In this case, the term "alumina according to the present invention" means both alumina according to the first aspect of the present invention and alumina according to the second aspect of the present invention.

<2. Alumina Slurry>

An alumina slurry according to the present invention includes the alumina according to the present invention, a binder, and a solvent.

It is possible to use known binders, and in the below-mentioned alumina porous film, the binder refers to a binder which can be used for binding between alumina particles, bonding between an alumina porous layer and a separator, or bonding between an alumina porous layer and a negative electrode and/or a positive electrode, and which is mainly composed of an organic substance. Specifically, it is possible to use fluororesins such as polyvinylidene fluoride (PVDF), polytetrafluoroethylene (PTFE), and a tetrafluoroethylene-hexafluoropropylene copolymer (FEP); polyacrylic acid derivatives such as polyacrylic acid, methyl polyacrylate, ethyl polyacrylate, and hexyl polyacrylate; polymethacrylic acid derivatives such as polymethacrylic acid, methyl polymethacrylate, ethyl polymethacrylate, and hexyl polymethacrylate; polyamide, polyimide, polyamideimide, polyvinyl acetate, polyvinylpyrrolidone, polyether, polyethersulfone, hexafluoropolypropylene, a styrene-butadiene rubber, carboxymethyl cellulose (hereinafter referred to as CMC), polyacrylonitrile, and derivatives thereof, polyethylene, polypropylene, an aramid resin, or salts thereof. These binders may be used alone, or two or more binders may be used as a mixture.

It is also possible to use a copolymer of two or more materials selected from tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene.

It is possible to use known solvents, for example, water, alcohol, acetone, tetrahydrofuran, methylene chloride, chloroform, dimethylformamide, N-methyl-2-pyrrolidone (NMP), cyclohexane, xylene, cyclohexanone, or mixed solvents thereof.

The content of the binder in the alumina slurry of the present invention is not particularly limited and is, for example, preferably in a range of 0.1 to 20 parts by weight based on 100 parts by mass of the alumina of the present invention. The content of the solvent in the alumina slurry of the present invention is not particularly limited and is, for example, preferably in a range of 10 to 500 parts by weight based on 100 parts by mass of the alumina of the present invention.

For the purpose of dispersion stabilization and improvement in coatability, various additives such as dispersants, thickeners, leveling agents, antioxidants, defoamers, pH adjustors containing an acid or alkali, and additives having a function of suppressing the side reaction such as decomposition of an electrolytic solution may be added to the alumina slurry of the present invention, in addition to the above-mentioned components. These additives are not particularly limited as long as they are chemically stable in a range of use of the nonaqueous electrolyte secondary battery, and do not exert a large influence on a battery reaction. These various additives are preferably capable of being removed when the alumina porous film is formed but may remain in the porous film. The content of each additive is not particularly limited and is preferably 10 parts by mass or less based on 100 parts by mass of the alumina of the present invention.

The alumina slurry of the present invention can be prepared by mixing the alumina of the present invention, a binder, and a solvent, followed by dispersion. The method for dispersing the alumina slurry is not particularly limited, and it is possible to use a stirring method using a known planetary mixer, or a dispersing method using ultrasonic irradiation or a beads mill.

<3. Alumina Porous Film, Secondary Battery and Method for Manufacturing the Same>

The alumina porous film produced from the obtained alumina slurry has high heat resistance and exhibits insulation properties. This alumina porous film is formed on at least one surface of a positive electrode, a negative electrode or a separator, and is suitably used in a nonaqueous electrolyte secondary battery including an electrode group (a laminated type electrode group) formed by laminating together with a positive electrode, a negative electrode and a separator or an electrode group (a wound type electrode group) formed by winding the alumina porous film together with the positive electrode, the negative electrode and the separator, and an electrolytic solution. As used herein, "separator" may be any one as long as it is a film for separating a positive electrode and a negative electrode, and means the separator for the secondary battery, especially the separator for the nonaqueous electrolyte secondary battery.

The method for suitably manufacturing such nonaqueous electrolyte secondary battery includes a method including: applying the above-mentioned alumina slurry on the surface of the positive electrode and/or the negative electrode composed of an electrode mixture layer containing an electrode active material (positive electrode active material or negative electrode active material) and the binder, followed by drying to form the alumina porous film. The method may also be a manufacturing method including: applying the above-mentioned alumina slurry on the separator, in place of the surface of the positive electrode and/or the negative electrode, followed by drying to form the alumina porous film.

More specific method for manufacturing the nonaqueous electrolyte secondary battery including the wound type electrode group in which the alumina porous film is formed on the negative electrode includes a method in which one end of a negative electrode lead is joined to a lead joining portion of the negative electrode including the alumina porous film on the surface thereof and one end of the negative electrode lead is joined to a lead joining portion of the positive electrode, and the positive electrode and the negative electrode are laminated and wound to each other via a separator to form the wound type electrode group, and then this electrode group is housed in a battery can in a state of being interposed between upper and lower insulation rings, followed by injecting an electrolytic solution and sealing with a battery cap.

The separator is a membranous porous film disposed between a positive electrode and a negative electrode in secondary battery.

Such a porous film may be made of a porous and membranous base material containing a polyolefin-based resin as a main component (polyolefin-based porous base material) and is a film having a structure including pores connected with each other therein, a gas and liquid being permeable from one surface to the other surface.

When the battery generates heat, the porous film is melted and becomes a non-porous state to impart the shutdown function to the separator. The porous film may be formed of a single layer or plural layers.

The piercing strength of the porous film is preferably 3N or more. If the piercing strength is too small, the separator may be broken by positive and negative electrode active material particles during laminating and winding operations of positive and negative electrodes and a separator of the battery assembling process, a clamping operation of the wound type electrode group, or application of pressure to the battery from the outside, which leads to short circuit of positive and negative electrodes. The piercing strength of the porous film is preferably 10N or less, and more preferably 8N or less.

The film thickness of the porous film may be appropriately determined taking into account the film thickness of members for a nonaqueous electrolyte secondary battery, which constitute the nonaqueous electrolyte secondary battery, and the thickness is preferably 4 to 40 μm, more preferably 5 to 30 μm, and still more preferably 6 to 15 μm.

The porosity by volume of the porous film is preferably 20 to 80%, and more preferably 30 to 75%, in order to retain a larger amount of an electrolytic solution and to obtain the function (shutdown) of reliably preventing the flow of an excessively large current at a lower temperature. The average size (average pore size) of the porous film is preferably 0.3 μm or less, and more preferably 0.14 μm or less so as to enable achievement of sufficient ion permeability and prevention of entering of particles into a positive electrode and a negative electrode when the porous film is used as a separator.

The proportion of the polyolefin-based resin in the porous film is usually 50% by volume or more, preferably 90% by volume or more, and more preferably 95% by volume or more, based on the entire porous film. It is preferred that a high-molecular weight component having a weight average molecular weight of $5\times10^5$ to $15\times10^6$ is included in the polyolefin-based resin of the porous film. It is particularly preferred that the strength of the porous film increases by containing, as the polyolefin-based resin of the porous film, a polyolefin component having a weight average molecular weight of 1,000,000 or more.

Examples of the polyolefin-based resin included in the porous film include a high-molecular weight homopolymer or copolymer obtained by polymerizing, for example, ethylene, propylene, 1-butene, 4-methyl-1-pentene, 1-hexene or the like. The porous film can be a layer containing one of these polyolefin-based resins alone, and/or two or more polyolefin-based resins. Particularly, a high-molecular weight polyethylene composed mainly of ethylene is preferable. The porous film may contain components other than polyolefin as long as the function of the layer is not impaired.

The air permeability of a porous film is usually in a range of 30 to 500 seconds/100 cc, and preferably 50 to 300 seconds/100 cc, in terms of the Gurley value. If the porous film has the air permeability in the above range, it is possible to obtain sufficient ion permeability when used as a separator.

The basis weight of the porous film is usually 4 to 20 g/m$^2$, preferably 4 to 12 g/m$^2$, and more preferably 5 to 10 g/m$^2$, in view of strength, film thickness, handleability and weight, and in view of increasing weight energy density and volume energy density of the battery when using as a separator of a secondary battery.

A method for manufacturing a porous film will be described below. A porous film containing a polyolefin-based resin as a main component is preferably manufactured by the following method when the porous film contains an ultrahigh-molecular weight polyolefin and a low-molecular weight hydrocarbon having a weight average molecular weight of 10,000 or less.

It is possible to obtain the porous film by the method including: (1) kneading an ultrahigh-molecular weight polyolefin, a low-molecular weight hydrocarbon having a weight average molecular weight of 10,000 or less, and a pore-forming agent to obtain a polyolefin resin composition; (2) rolling the polyolefin resin composition using a rolling mill roll to form a sheet (rolling step); (3) removing the pore-forming agent from the sheet obtained in the step (2); and (4) of drawing the sheet obtained in the step (3) to obtain a porous film. Before the operation of removing the pore-forming agent in the sheet in the step (3), the operation of drawing the sheet in the step (4) may be performed.

Examples of the low-molecular weight hydrocarbon include a low-molecular weight polyolefin such as polyolefin wax, and a low-molecular weight polymethylene such as Fischer-Tropsch wax. The weight average molecular weight of the low-molecular weight polyolefin and low-molecular weight polymethylene is preferably 200 or more and 3,000 or less. If the weight average molecular weight is 200 or more, there is no risk of evaporation during formation of a porous film. It is preferred that the weight average molecular weight is 3,000 or less since mixing with the ultrahigh-molecular weight polyolefin is performed more uniformly.

Examples of the pore-forming agent include an inorganic filler and a plasticizer. Examples of the inorganic filler include an inorganic filler which can dissolved in an aqueous solvent containing an acid, an aqueous solvent containing an alkali, or an aqueous solvent composed mainly of water.

Examples of the inorganic filler, which can be dissolved in the aqueous solvent containing an acid, include calcium carbonate, magnesium carbonate, barium carbonate, zinc oxide, calcium oxide, aluminum hydroxide, magnesium hydroxide, calcium hydroxide, and calcium sulfate, and calcium carbonate is preferable in view of the fact that it is inexpensive and is easy to obtain a fine powder. Examples of the inorganic filler, which can be dissolved in the aqueous solvent containing an alkali, include silicic acid, and zinc oxide, and silicic acid is preferable since it is inexpensive and is easy to obtain a fine powder. Examples of the inorganic filler, which can be dissolved in the aqueous solvent composed mainly of water, include calcium chloride, sodium chloride and magnesium sulfate.

Examples of the plasticizer include a low-molecular weight nonvolatile hydrocarbon compound such as liquid paraffin and mineral oil.

The alumina porous film is optionally laminated on one or both surfaces of the separator which is the porous film.

There is no particular limitation on the method for applying the alumina slurry onto the separator, namely, a method for forming an alumina porous film on a surface of a separator, optionally subjected to a hydrophilization treatment. When the layer of the alumina porous film is laminated on both surfaces of the separator, it is possible to apply a sequential laminating method in which the alumina porous film is formed on one surface of the separator and then the alumina porous film is formed on the other surface, or a simultaneous laminating method in which the alumina porous films are simultaneously formed on both surfaces of the separator.

Examples of the method for forming an alumina porous film include a method in which an alumina slurry is directly applied onto the surface of the separator and then a solvent (dispersion medium) is removed; a method in which the alumina slurry is applied to an appropriate support and a solvent (dispersion medium) was removed to form the alumina porous film, and then this alumina porous film and the separator are pressure-bonded with each other and the support is peeled off; a method in which the alumina slurry is applied to an appropriate support and the porous film is pressure-bonded to the coated surface, and then the support is peeled off and the solvent (dispersion medium) is removed; and a method in which a separator is dipped in an alumina slurry to perform dip coating and then a solvent (dispersion medium) is removed.

It is possible to control the thickness of the alumina porous film by adjusting the thickness of a coating film in a wet state after coating, the weight ratio of a resin to microparticles, the solid component concentration of the alumina slurry (sum of the concentration of the resin and the concentration of microparticles) and the like. It is possible to use, as the support, for example, a film made of a resin, a belt made of metal, or a drum.

The method for applying the alumina slurry to the separator or the support is not particularly limited as long as the method is capable of realizing required basis weight and coated area. A conventionally known method can be employed as the method for applying the alumina slurry. Specific examples of such method include a gravure coater method, a small-diameter gravure coater method, a reverse roll coater method, a transfer roll coater method, a kiss coater method, a dip coater method, a knife coater method, an air doctor blade coater method, a blade coater method, a rod coater method, a squeeze coater method, a cast coater method, a bar coater method, a die coater method, a screen printing method and a spray applying method.

The method for removing a solvent (dispersion medium) is generally a method by drying. Examples of the drying method include a natural drying method, a fan drying method, a heat drying method and a vacuum drying method, and may be any method as long as the solvent (dispersion medium) can be sufficiently removed. A usual drying device can be used for drying.

When heating is performed to remove a solvent (dispersion medium) from the coating film of the alumina slurry formed on the separator or support, heating is desirably performed at the temperature at which the air permeability of the separator is not degraded, specifically 10 to 120° C., and more preferably 20 to 80° C., in order to avoid degradation of air permeability due to contraction of pores of the porous film.

The thickness of the alumina porous film formed by the above-mentioned method is preferably 0.5 to 15 μm (per one surface), more preferably 2 to 10 μm (per one surface), and still more preferably 2 to 5 μm (per one surface), when the separator is used as a base material and the alumina porous film is laminated on one or both surfaces of the separator to form the laminated separator.

The thickness of the alumina porous film is preferably 1 μm or more (0.5 μm or more on one surface) since it is possible to sufficiently prevent internal short circuit due to breakage of the battery in the laminated separator including the alumina porous film and to maintain the retaining amount of the electrolytic solution in the alumina porous film. Meanwhile, the thickness of the alumina porous film is preferably 30 μm or less (15 μm or less on one surface) in total of both surfaces since it is possible to suppress an increase in permeation resistance of ions such as lithium ions over the entire laminated separator including the alumina porous film to prevent degradation of the positive electrode and degradation of rate characteristic and cycle characteristic when charge/discharge cycle is repeated, and to suppress an increase in distance between the positive electrode and the negative electrode to prevent an increase in size of the secondary battery.

In the following description with respect to physical properties of the alumina porous film, when a porous layer is laminated on both surfaces of the porous film, the physical properties at least indicate physical properties of the alumina porous film laminated to the surface opposite to the positive electrode in the porous film when assembling the secondary battery.

The basis weight per unit area (per one surface) of the alumina porous film may be appropriately determined taking into account the strength, film thickness, weight, and handleability of the laminated separator. The basis weight is usually 1 to 20 $g/m^2$, preferably 4 to 15 $g/m^2$, and more preferably 4 to 12 $g/m^2$, so as to increase the weight energy density and volume energy density of a nonaqueous electrolyte secondary battery including the laminated separator as the member. The basis weight of the alumina porous film is preferably in the above range since it is possible to increase the weight energy density and volume energy density of the nonaqueous electrolyte secondary battery including the laminated separator with the alumina porous film as the member, and to reduce the weight of the battery.

The porosity of the alumina porous film is preferably 20 to 90% by volume, and more preferably 30 to 70% by volume, since the laminated separator with the alumina porous film can obtain sufficient ion permeability. The pore size of pores possessed by the alumina porous film is preferably 1 μm or less, and more preferably 0.5 μm or less, since the laminated separator with the alumina porous film can obtain sufficient ion permeability.

The air permeability of the laminated separator is preferably 30 to 1,000 seconds/100 mL, and more preferably 50 to 800 seconds/100 mL, in terms of the Gurley value. When the laminated separator has the air permeability, it is possible to obtain sufficient ion permeability when the laminated separator is used as a member for the nonaqueous electrolyte secondary battery.

If the air permeability exceeds the above range, it means that the laminated separator has a coarse laminated structure because of high porosity of the laminated separator. As a result, the strength of the separator may be reduced, leading to insufficient shape stability at high temperature. Meanwhile, if the air permeability is in the above range, it may be impossible to obtain sufficient ion permeability when the laminated separator is used as a member for the nonaqueous electrolyte secondary battery, lading to degradation of battery characteristic of a nonaqueous electrolyte secondary battery.

EXAMPLES

The present invention will be described in detail by way of Examples, but the present invention is not limited only to the following Examples. Methods for evaluation of the respective physical properties are as follows.

Alumina According to First Aspect of the Present Invention (Purity)

(Contents of K, Mg, Ca, Sr, Ba and La and Purity)

The purity (% by mass) of alumina was determined from the following formula (III) using the contents of K, Mg, Ca, Sr, Ba and La and the contents of $SiO_2$, $Na_2O$, CuO, $Fe_2O_3$ and $ZrO_2$ in 100% by mass of alumina.

Purity (% by mass)=100×{100−(sum total [% by mass] of contents of K, Mg, Ca, Sr, Ba and La)−(sum total [% by mass] of contents of $SiO_2$, $Na_2O$, CuO, $Fe_2O_3$ and $ZrO_2$)}÷{100−(sum total [% by mass] of contents of K, Mg, Ca, Sr, Ba and La)} Formula (III)

The contents of K, Mg, Ca, Sr, Ba and La of evaluation sample were determined by measuring using ICP emission spectroscopy.

The contents of $SiO_2$, $Na_2O$, CuO, $Fe_2O_3$ and $ZrO_2$ were determined by converting the contents of Si, Na, Cu, Fe and Zr, obtained by measuring an evaluation sample using ICP emission spectroscopy, into the contents of oxides ($SiO_2$, $Na_2O$, CuO, $Fe_2O_3$ and $ZrO_2$) corresponding to each element.

(BET Specific Surface Area)

Using "Flow Sorb II 2300" manufactured by Shimadzu Corporation as a specific surface area measuring apparatus, a BET specific surface area was determined by the nitrogen absorption method (one-point method) in accordance with the method defined in JIS-Z8830 (2013). A drying treatment before the measurement was performed by heating under a nitrogen gas flow at 200° C. for 20 minutes.

(Surface Concentration of K, Mg, Ca, Sr, Ba and La)

Using an X-ray photoelectron spectrometer (AXIS-ULTRA, manufactured by KRATOS Analytical Limited), the surface concentration of Al, O, Na, K, Mg, Ca, Sr, Ba and La was calculated. Regarding a measurement sample, a conductive carbon tape was stuck on a sample holder dedicated to the spectrometer and a powder sample was filled in a washer fixed to the tape, and then the measurement was performed under the conditions shown below. Using the Quadratic Savitzky-Golay method, the thus obtained spectrum was subjected to smoothing by setting a kernel width (smoothing score) at 11. After charge correction by setting a peak of C1s at 284.6 eV, background was subtracted by the linear method and the atomic concentration of Al, O, Na, K, Mg, Ca, Sr, Ba and La was calculated using a sensitivity coefficient (using the value of "VISION2" integrated to the spectrometer) of each element.

Measurement mode: Narrow scan mode

X-ray source: Alkα

X-ray output: 15 kV, 15 mA

Pass energy: 20 eV

Measurement step width: 0.10 eV

Measurement area: 700 μm×300 μm or more

Vacuum degree during measurement: $1\times10^{-7}$ torr or less

Charge neutralization mechanism: used

Element to be measured: Al2p, O1s, Na1s, K2p, Mg1s, Ca2p, Sr3d, Ba3d, La3d (Particle Diameter)

Using a laser particle size distribution analyzer ["Microtrac MT3300EXII", manufactured by MicrotracBEL Corp.], a particle diameter equivalent to 50% cumulative percentage by mass measured by a laser diffraction method was regarded as an average particle diameter. In the measurement, ultrasonic dispersion was performed for 5 minutes in a 0.2% by mass aqueous sodium hexametaphosphate solution and a refractive index was 1.76.

(Formation of Base Material Porous Film (Separator))

After mixing 70% by mass of an ultrahigh-molecular weight polyethylene powder (340M, manufactured by Mitsui Chemicals, Inc.) with 30% by mass of a polyethylene wax having a mass average molecular weight of 1,000 (FNP-0115, manufactured by Nippon Seiro Co., Ltd.), 0.4 part by mass of an antioxidant (Irg1010, manufactured by Ciba Specialty Chemicals Inc.), 0.1 part by mass of an antioxidant (P168, manufactured by Ciba Specialty Chemicals Inc.), and 1.3 parts by mass of sodium stearate were added relative to 100 parts by mass of the total amount of the ultrahigh-molecular weight polyethylene and the polyethylene wax, and then calcium carbonate having an average particle diameter of 0.1 μm (manufactured by Maruo Calcium Co., Ltd.) was added so that the proportion became 38% by volume based on the total volume. After mixing in the form of a powder using a Henschel mixer, the thus obtained powder mixture was melt-kneaded by a twin-screw extruder to obtain a polyolefin resin composition. The polyolefin resin composition was rolled by a pair of rolls at a surface temperature of 150° C. to form a sheet. This sheet was immersed in an aqueous hydrochloric acid solution (hydrochloric acid of 4 mol/L, nonionic surfactant of 0.5% by mass), followed by removal calcium carbonate. Subsequently, the sheet was drawn six times at 105° C. to obtain a base material porous film (film thickness: 16.2 μm, basis weight: 7.3 g/m², air permeability: 140 seconds/100 cc).

(Formation of Laminated Porous Film for Evaluation)

A laminated porous film for evaluation was formed as a sample film for evaluation of an alumina porous film by the following method.

CMC manufactured by Dai-ichi Kogyo Seiyaku Co., Ltd.: part number 1110 (3 parts by mass), isopropyl alcohol (51.6 parts by mass), pure water (292 parts by mass), and alumina (100 parts by mass) were mixed in order, followed by stirring. After dispersion for 30 minutes using a beads mil having a media diameter φ of 0.65 mm, the thus obtained dispersion was filtered through a net with 10 μm mesh size to prepare a slurry.

Using a bar coater (#20), the slurry was applied onto a base material porous film and dried at a drying temperature of 65° C. to obtain a laminated porous film for evaluation in which an alumina porous film is formed on a surface of the base material porous film.

(Slurry Viscosity)

Using "TVB10M" manufactured by TOKI SANGYO CO., LTD. as a viscometer, the viscosity of a slurry used in the case of forming the laminated porous film for evaluation was measured by rotating a No. 3 rotor at 6 rpm.

(Coating Film Thickness of Inorganic Alumina Porous Film)

The thickness (unit: μm) was measured by a high-accuracy digital measuring instrument "VL-50A" manufactured by Mitutoyo Corporation. The coating film thickness D (μm) of an alumina porous film was calculated by subtracting the thickness of a base material porous film from the thickness of a laminated porous film.

(Basis Weight of Alumina Porous Film)

A square sample measuring 8 cm×8 cm was cut out from a laminated porous film and the mass W (g) of the sample was measured and a basis weight (g/m$^2$) (=W/(0.08×0.08)) of a laminated porous film was calculated first. The basis weight B (g/m$^2$) of the alumina porous film was calculated by subtracting a basis weight of a base material porous film from the basis weight of the laminated porous film.

(Porosity of Alumina Porous Film)

A square sample measuring 8 cm×8 cm was cut out from a laminated porous film and the mass W' (g) of the sample was measured and the mass of the alumina porous film was calculated from a difference between the W (g) and the W' (g). From the mass of the alumina porous film and the composition of the slurry, the mass W1 (g) of alumina and the mass W2 (g) of CMC in the square sample measuring 8 cm×8 cm cut out from the laminated porous film were respectively determined by calculation, and the porosity (% by volume) was determined from the following formula (VI). The true density ρ1 of α alumina was 3.98 (g/cm$^3$) and the true density ρ2 of CMC was 1.6 (g/cm$^3$).

$$\text{Porosity (\% by volume)}=100-(B\div D)\div[(W1+W2)\div\{(W1\div\rho1)+(W2=\rho2)\}]\times100 \quad \text{Formula (VI)}$$

(Heat Shape Retention Ratio)

A square sample measuring 8 cm (MD direction)×8 cm (TD direction) was cut out from a laminated porous film and a square measuring 6 cm (MD direction)×6 cm (TD direction) was drawn in the sample. Each length of two sides in parallel with the MD direction of the drawn square was accurately measured (two decimal places with cm unit) and an average L1 thereof was calculated. Next, the sample was interposed between papers and placed in an oven heated at 150° C. After 1 hour, the sample was taken out from the oven and each length of two sides in parallel with the MD direction of the drawn square was accurately measured and an average L2 thereof was calculated. Using L1 and L2, an MD heat shape retention ratio was calculated from the following formula (VII).

$$MD \text{ heat shape retention ratio (\%)}=(L2\div L1)\times100 \quad \text{Formula (VII)}$$

(Air Permeability)

In accordance with JIS P8117(2009), the Gurley value of a laminated porous film was measured by a Gurley type densometer manufactured by Toyo Seiki Seisaku-sho, Ltd.

(Electrolytic Solution Stability Test)

After vacuum-drying alumina at 120° C. for 8 hours, 1 g of the alumina and 2 mL of an electrolytic solution were sealed into an aluminum laminate bag in a glove box maintained at a dew point of −30° C. or lower, and then the mass of the aluminum laminate bag after sealing was measured. As the electrolytic solution, a $LiPF_6$ solution (1 mol/L, ethylene carbonate:ethylmethyl carbonate:diethyl carbonate=30% by volume:50% by volume:20% by volume) manufactured by KISHIDA CHEMICAL Co., Ltd. was used. Before a heat treatment, the specific gravity and volume of the aluminum laminate bag after sealing were measured by the Archimedes method and then the aluminum laminate bag was subjected to a heat treatment at 85° C. for 72 hours. After the heat treatment, the specific gravity and volume of the aluminum laminate bag were measured by the Archimedes method, and a change in volume before and after a heat treatment was calculated as the amount of gas generated.

Examples 1 to 3

Using aluminum hydroxide prepared by the Bayer's method as a raw material, the aluminum hydroxide was calcined in a gas furnace and then crushed by a ball mill to obtain an α phase alumina powder having an average particle diameter of 0.5 μm and a BET specific surface area of 6 m$^2$/g.

The α alumina powder was dispersed in an ethanol solution of magnesium nitrate hexahydrate, vacuum-dried at 60° C. and then heated at 600° C. for 2 hours to obtain Mg-modified alumina powders (1) to (3) each containing 690 to 8,700 ppm by mass of Mg shown in Table 1.

The amount of Mg on a surface of the thus obtained Mg-modified alumina powders (1) to (3) was high, e.g., 1.1 to 3.7 at %. As a result of the electrolytic solution stability test, a gas was generated in a very small amount of 10 to 22 mL/g.

Each amount of impurities of the Mg-modified alumina powder (1) was as follows: 0.02% by mass of Si, 0.03% by mass of Na, 0.01% by mass of Fe, 10 ppm by mass or less of Cu, and 10 ppm by mass or less of Zr, and the purity of the alumina excluding Mg added was 99.9% by mass or more. Alumina of the alumina powder thus obtained was α phase alumina having an average particle diameter of 0.5 μm and a BET specific surface area of 6 m$^2$/g.

Furthermore, an α alumina slurry was prepared from the α alumina powder (1) by the above-mentioned method. As a result, the average particle diameter was 0.5 μm and the viscosity was 91 mPa·s. This slurry was applied onto a base material porous film to form a laminated porous film for evaluation in which an alumina porous film is formed on a surface. The porosity of the alumina porous film was 38% and the MD heat shape retention ratio of the thus obtained laminated porous film was 98%. In addition, the evaluation results such as coating film thickness, basis weight, and air permeability are shown in Table 2. As is apparent from the fact that the alumina porous film thus obtained has sufficient porosity to ion permeation, air permeability, and high heat resistance, it is possible to obtain a high nonaqueous electrolyte secondary battery having satisfactory battery performance and high safety regardless of small basis weight by using this alumina powder.

Examples 4 to 16

The treatment was performed in the same manner as in Examples 1 to 3, except that an ethanol solution of potassium nitrate, calcium nitrate, strontium nitrate, barium nitrate, and lanthanum acetate was used in place of magnesium nitrate hexahydrate of Examples 1 to 3, metal-modified alumina powders (4) to (16) each containing K, Ca, Sr, Ba, and La in the content (ppm by weight) and the surface concentration (at %) shown in Table 1 were obtained. Using each alumina powder, the above-mentioned electrolytic solution stability test was performed. The results are shown in Table 1.

Comparative Example 1

Using aluminum hydroxide prepared by the Bayer's method as a raw material, the aluminum hydroxide was calcined in a gas furnace and then crushed by a ball mill to obtain an α phase alumina powder (A) having an average particle diameter of 0.5 μm and a BET specific surface area of 6 $m^2/g$. Any heteroelement was not added. The total content of K, Mg, Ca, Sr, Ba and La of the thus obtained alumina powder (A) was 176 ppm by mass and the total surface concentration of K, Mg, Ca, Sr, Ba and La on an alumina surface was 0.1 at %. As a result of the electrolytic solution stability test, a gas was generated in a large amount of 75 mL/g and thus the alumina powder was inferior in electrolytic solution stability.

TABLE 1

| | Alumina | Content of modifying element (ppm by weight) | Surface concentration of modifying element (at %) | Electrolytic solution stability (mL/g) |
|---|---|---|---|---|
| Example 1 | Mg-modified alumina powder (1) | 690 | 1.1 | 22 |
| Example 2 | Mg-modified alumina powder (2) | 4,600 | 3.3 | 13 |
| Example 3 | Mg-modified alumina powder (3) | 8,700 | 3.7 | 10 |
| Example 4 | K-modified alumina powder (4) | 10,400 | 2.5 | 44 |
| Example 5 | Ca-modified alumina powder (5) | 630 | 0.65 | 18 |
| Example 6 | Ca-modified alumina powder (6) | 1,100 | 0.75 | 17 |
| Example 7 | Ca-modified alumina powder (7) | 4,900 | 3.6 | 9 |
| Example 8 | Ca-modified alumina powder (8) | 10,400 | 5.5 | 1 |
| Example 9 | Sr-modified alumina powder (9) | 5,000 | 1.3 | 13 |
| Example 10 | Sr-modified alumina powder (10) | 10,300 | 1.1 | 14 |
| Example 11 | Ba-modified alumina powder (11) | 50,00 | 2.1 | 25 |
| Example 12 | Ba-modified alumina powder (12) | 10,100 | 2.5 | 19 |
| Example 13 | La-modified alumina powder (13) | 980 | 0.5 | 17 |
| Example 14 | La-modified alumina powder (14) | 4,600 | 1.3 | 9 |
| Example 15 | La-modified alumina powder (15) | 8,700 | 2.3 | 5 |
| Example 16 | La-modified alumina powder (16) | 18,700 | 4.6 | 3 |
| Comparative Example 1 | Alumina powder (A) | 176 | 0.1 | 75 |

TABLE 2

| | Porosity of alumina porous film (%) | MD heat shape retention ratio (%) | Coating film thickness of alumina porous film (μm) | Basis weight of alumina porous film ($g/m^2$) | Air permeability (seconds/ 100 cc) |
|---|---|---|---|---|---|
| Example 1 | 38 | 98 | 4.1 | 9.6 | 268 |

Alumina According to Second Aspect of the Present Invention (Infrared Absorption Spectrum)

Using MAGNA760 manufactured by Nicolet Corp. as a Fourier transform infrared spectrophotometer, an infrared absorption spectrum of alumina was measured by the diffuse reflectance method under the following conditions, and the infrared absorption spectrum thus obtained was allowed to undergo Kubelka-Munk conversion.

Vacuum-heating type diffuse reflection cell: HC-900, manufactured by ST Japan INC.

Detector: DIGS KBr

Beam splitter: KBr

Mirror rate: 0.6329

Sample gain: 8

Resolution: 4 $cm^{-1}$

Scanning time: 512 times

Background: KBr

Vacuum degree: 0.5 torr or less

It was evaluated, in an infrared absorption spectrum of the alumina obtained after Kubelka-Munk conversion, whether or not a peak having an intensity larger than that of a baseline defined by a line segment connecting an intensity at 3,400 $cm^{-1}$ and an intensity at 3,500 $cm^{-1}$, and a peak having a half width of 90 $cm^{-1}$ or less, exists in a range of 3,400 to 3,500 $cm^{-1}$.

(Thermogravimetric Analysis)

Using ThermoPlus TG8120 manufactured by Rigaku Corporation as a thermogravimetric analyzer, thermogravimetric analysis of alumina was performed under the following conditions.

Atmospheric gas: He 300 ml/min

Temperature rising rate: 20° C./min

Temperature rising range: room temperature (25° C. or lower) to 480° C.

From the thus obtained results of thermogravimetric analysis, mass loss rates A and B were calculated by the following formulas (I) and (II).

Mass loss rate $A$ [%]=(mass [g] of alumina at 25° C.−mass [g] of alumina at 150° C.)÷mass [g] of alumina at 25° C.×100 Formula (I)

Mass loss rate $B$ [%]=(mass [g] of alumina at 200° C.−mass [g] of alumina at 260° C.)÷mass [g] of alumina at 25° C.×100 Formula (II)

Using the following formula (IV), a mass loss rate C per 10° C. of alumina in a range of 200 to 260° C. was calculated and the maximum value thereof was determined.

Mass loss rate $C$ [%]=(mass [g] of alumina at $t$ [° C.] −mass [g] of alumina at ($t$+10) [° C.])÷mass [g] of alumina at $t$ [° C.]×100 formula (IV)

where, $200 \leq t \leq 250$.

(Purity)

The purity (% by mass) of alumina was determined from the following formula (V) using the contents of $SiO_2$, $Na_2O$, CuO, $Fe_2O_3$ and $ZrO_2$ in 100% by mass of alumina.

Purity (% by mass)=100−(sum total [% by mass] of contents of $SiO_2$, $Na_2O$, CuO, $Fe_2O_3$ and $ZrO_2$) Formula (V)

The contents of $SiO_2$, $Na_2O$, CuO, $Fe_2O_3$ and $ZrO_2$ were determined by converting the contents of Si, Na, Cu, Fe and Zr, obtained by measuring an evaluation sample using ICP emission spectroscopy, into the contents of oxides ($SiO_2$, $Na_2O$, CuO, $Fe_2O_3$ and $ZrO_2$) corresponding to each element.

(BET Specific Surface Area)

Using "Flow Sorb II 2300" manufactured by Shimadzu Corporation as a specific surface area measuring apparatus, a BET specific surface area was determined by the nitrogen absorption method (one-point method) in accordance with the method defined in JIS-Z8830 (2013). A drying treatment before the measurement was performed by heating under a nitrogen gas flow at 200° C. for 20 minutes.

(Particle Diameter)

Using a laser particle size distribution analyzer ["Microtrac MT3300EXII", manufactured by MicrotracBEL Corp.], a particle diameter equivalent to 50% cumulative percentage by mass measured by a laser diffraction method was regarded as an average particle diameter. In the measurement, ultrasonic dispersion was performed for 5 minutes in a 0.2% by mass aqueous sodium hexametaphosphate solution and a refractive index was 1.76.

(Electrolytic Solution Stability Test)

After vacuumed-drying alumina at 120° C. for 8 hours, 1 g of the alumina and 2 mL of an electrolytic solution were sealed into an aluminum laminate bag in a glove box maintained at a dew point of −30° C. or lower, and then the mass of the aluminum laminate bag after sealing was measure. As the electrolytic solution, a $LiPF_6$ solution (1 mol/L, ethylene carbonate:ethylmethyl carbonate:diethyl carbonate=30% by volume:50% by volume:20% by volume) manufactured by KISHIDA CHEMICAL Co., Ltd. was used. Before a heat treatment, the specific gravity and volume of the aluminum laminate bag after sealing were measured by the Archimedes method and then the aluminum laminate bag was subjected to a heat treatment at 85° C. for 72 hours. After the heat treatment, the specific gravity and volume of the aluminum laminate bag were measured by the Archimedes method, and a change in volume before and after a heat treatment was calculated as the amount of gas generated.

Example 17

Using aluminum hydroxide prepared by the Bayer's method as a raw material, the aluminum hydroxide was calcined in a gas furnace and then crushed by a ball mill. The crushed alumina powder was subjected to a heat treatment at 600° C. for 2 hours to obtain an α alumina powder (17) having an average particle diameter of 0.4 μm and a BET specific surface area of 6 $m^2/g$.

As shown in FIG. 1, regarding the α alumina powder (17), in an infrared absorption spectrum of the alumina obtained by Fourier-transform infrared spectroscopy, a peak having an intensity larger than a baseline defined by a line segment connecting an intensity at 3,400 $cm^{-1}$ and an intensity at 3,500 $cm^{-1}$, and having a half width of 90 $cm^{-1}$ or less, did not exist in a range of 3,400 to 3,500 $cm^{-1}$. The mass loss rate A was 0.11%, the mass loss rate B was 0.01%, the maximum value of the mass loss rate C was 0.002%, and the purity was 99.89% by mass. As mentioned above, regarding the α alumina powder (17), the amount of hydrated water in alumina trihydrate existing on alumina surface is small. Therefore, as a result of the electrolytic solution stability test, a gas was generated in a very small amount of 30 mL/g and thus the alumina powder was excellent in electrolytic solution stability. The presence of the peak, the mass loss rates A and B, the BET specific surface area, and the evaluation results of the electrolytic solution stability are shown in Table 3. In Table 3, "peak in infrared absorption spectrum" means "peak which has an intensity larger than that of a baseline defined by a line segment connecting an intensity at 3,400 $cm^{-1}$ and an intensity at 3,500 $cm^{-1}$, and has a half width is 90 $cm^{-1}$ or less, in an infrared absorption spectrum of the alumina obtained by Fourier-transform infrared spectroscopy".

Comparative Example 2

In the same manner as in Example 17, using aluminum hydroxide prepared by the Bayer's method as a raw material, the aluminum hydroxide was calcined in a gas furnace and then crushed by a ball mill to obtain an α phase alumina powder (B) having an average particle diameter of 0.4 μm and a BET specific surface area of 6 $m^2/g$. Neither addition of any heteroelement nor heat treatment was performed to obtain an α alumina powder (B).

As shown in FIG. 1, regarding the α alumina powder (B), in an infrared absorption spectrum of the alumina obtained by Fourier-transform infrared spectroscopy, a peak having an intensity larger than a baseline defined by a line segment connecting an intensity at 3,400 cm' and an intensity at 3,500 $cm^{-1}$ and having a half width of 90 $cm^{-1}$ or less, existed in a range of 3,400 to 3,500 $cm^{-1}$. The mass loss rate A was 0.14%, the mass loss rate B was 0.07%, the maximum value of the mass loss rate C was 0.02%, and the purity was 99.89% by mass. As mentioned above, regarding the α alumina powder (B), the amount of hydrated water in alumina trihydrate existing on alumina surface is large. Therefore, as a result of the electrolytic solution stability test, a gas was generated in a large amount of 75 mL/g and thus the alumina powder was inferior in electrolytic solution stability. The presence of the peak, the mass loss rates A and B, the BET specific surface area, and the evaluation results of the electrolytic solution stability are shown in Table 3.

TABLE 3

| | Alumina | Presence of peak in infrared absorption spectrum | Mass loss rate A (%) | Mass loss rate B (%) | BET ($m^2/g$) | Electrolytic solution stability (mL/g) |
|---|---|---|---|---|---|---|
| Example 17 | α alumina (17) | Not exist | 0.11 | 0.01 | 6 | 30 |
| Comparative Example 2 | α alumina (B) | Exist | 0.14 | 0.07 | 6 | 75 |

INDUSTRIAL APPLICABILITY

The alumina according to first and second aspects of present invention can provide an alumina porous film having excellent electrolytic solution stability as applications of a nonaqueous electrolyte secondary battery. A nonaqueous electrolyte secondary battery including the alumina porous film on at least one surface of a positive electrode, a negative electrode, or a separator is a secondary battery having excellent battery performance and safety and is therefore industrially useful.

The invention claimed is:

1. Alumina comprising one or more selected from the group consisting of K, Mg, Ca, Sr, Ba and La in the total amount of 200 to 50,000 ppm by mass, wherein a surface concentration of the one or more elements selected from the group consisting of K, Mg, Ca, Sr, Ba and La is 0.5 to 20 atomic % in total;

wherein the surface concentration is the concentration of the element on the alumina surface measured by X-ray photoelectron spectroscopy; and wherein the alumina has a BET specific surface area of 1 to 20 $m^2/g$, and the alumina is α alumina.

2. An alumina slurry comprising: alumina according to claim 1; a binder; and a solvent.

3. An alumina porous film comprising: the alumina according to claim 1; and a binder.

4. A laminated separator comprising: a separator; and the alumina porous film according to claim 3.

5. A nonaqueous electrolyte secondary battery, wherein an alumina porous film including the alumina according to claim 1 is formed on at least one surface of a positive electrode, a negative electrode or a separator.

6. A method for manufacturing a nonaqueous electrolyte secondary battery, comprising: applying the alumina slurry according to claim 2 onto at least one surface of a positive electrode, a negative electrode or a separator, followed by drying the alumina slurry to form an alumina porous film.

* * * * *